(12) United States Patent
Romano et al.

(10) Patent No.: US 10,585,179 B2
(45) Date of Patent: Mar. 10, 2020

(54) SYSTEMS, METHODS, AND APPARATUSES FOR DETERMINING THE DISTANCE BETWEEN TWO POSITIONS

(71) Applicant: GOVERNMENT OF THE UNITED STATES OF AMERICA, AS REPRESENTED BY THE SECRETARY OF THE NAVY, Washington, DC (US)

(72) Inventors: Marcello Romano, Monterey, CA (US); Sergio Restaino, Alexandria, VA (US); Joseph Helmboldt, Crofton, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/007,832

(22) Filed: Jun. 13, 2018

(65) Prior Publication Data

US 2018/0356504 A1    Dec. 13, 2018

Related U.S. Application Data

(60) Provisional application No. 62/518,881, filed on Jun. 13, 2017.

(51) Int. Cl.
*G01S 11/02* (2010.01)
*G01S 13/78* (2006.01)
(Continued)

(52) U.S. Cl.
CPC .......... *G01S 11/026* (2013.01); *A63B 67/068* (2013.01); *G01S 5/00* (2013.01);
(Continued)

(58) Field of Classification Search
CPC .......... G01S 11/026; G01S 11/08; G01S 5/00; G01S 7/10; G01S 11/00; G01S 13/08;
(Continued)

(56) References Cited

U.S. PATENT DOCUMENTS

5,902,341 A * 5/1999 Wilson ............... B61L 15/0027
246/122 R
6,150,979 A * 11/2000 Tsui ......................... G01S 5/12
342/126
(Continued)

*Primary Examiner* — Dominic E Rego
(74) *Attorney, Agent, or Firm* — US Naval Research Laboratory (57) ABSTRACT

Systems, methods, and apparatuses for determining the distance between two positions are disclosed. The system includes a correlator, a first receiver, and a second receiver. The first and second receivers each include: an antenna, a steering mechanism, and a processor. The steering mechanism steers the antenna in an azimuthal direction and an elevation direction. The processor is configured to (i) control the steering mechanism, (ii) receive data recorded by the antenna from a plurality of sources, (iii) time-stamp the data recorded by the antenna, and (iv) control the transmission of the time-stamped data to the correlator. The correlator is configured to receive the time-stamped recorded data from the first receiver and the second receiver, and calculate a distance between the first receiver and the second receiver based thereon.

20 Claims, 10 Drawing Sheets

(51) Int. Cl.
*G01S 11/00* (2006.01)
*G01S 13/10* (2006.01)
*G01S 13/84* (2006.01)
*A63B 7/06* (2006.01)
*G01S 11/08* (2006.01)
*A63B 67/06* (2006.01)
*G01S 7/00* (2006.01)
*G01S 13/42* (2006.01)
*G01S 13/08* (2006.01)
*G01S 15/08* (2006.01)
*G01S 17/08* (2006.01)
*G01S 5/00* (2006.01)
*G01S 11/04* (2006.01)

(52) U.S. Cl.
CPC ............ *G01S 7/00* (2013.01); *G01S 11/00* (2013.01); *G01S 11/02* (2013.01); *G01S 11/04* (2013.01); *G01S 11/08* (2013.01); *G01S 13/08* (2013.01); *G01S 13/103* (2013.01); *G01S 13/42* (2013.01); *G01S 13/785* (2013.01); *G01S 13/84* (2013.01); *G01S 15/08* (2013.01); *G01S 17/08* (2013.01)

(58) Field of Classification Search
CPC .. G01S 13/103; G01S 13/42; G01S 2013/466; G01S 13/785; G01S 13/84; G01S 15/08; G01S 17/08; A63B 2220/17; A63B 67/068
See application file for complete search history.

(56) References Cited

U.S. PATENT DOCUMENTS

| | | | |
|---|---|---|---|
| 9,812,031 B1* | 11/2017 | Wahrmund | G01S 5/0294 |
| 2011/0170430 A1* | 7/2011 | Yang | G01D 21/00 |
| | | | 370/252 |
| 2012/0330527 A1* | 12/2012 | Kumabe | B60W 40/04 |
| | | | 701/96 |
| 2013/0316750 A1* | 11/2013 | Couch | H04L 43/08 |
| | | | 455/501 |
| 2014/0266907 A1* | 9/2014 | Taylor, Jr. | G01S 5/10 |
| | | | 342/387 |
| 2015/0236779 A1* | 8/2015 | Jalali | H04B 7/18508 |
| | | | 342/367 |
| 2015/0375970 A1* | 12/2015 | Eidenberger | B66C 13/46 |
| | | | 212/312 |
| 2017/0286730 A1* | 10/2017 | Sadr | G01S 5/14 |
| 2017/0365933 A1* | 12/2017 | Topak | H01Q 21/005 |
| 2017/0368411 A1* | 12/2017 | Komatsu | A63B 43/00 |

* cited by examiner

SYSTEMS, METHODS, AND APPARATUSES FOR DETERMINING THE DISTANCE BETWEEN TWO POSITIONS

BACKGROUND

Field of the Invention

The present application relates generally to determining the distance between two positions.

Description of related art

There are numerous applications where it is useful to know the distance between two positions with a high degree of accuracy. How that distance is determined depends on where the two positions are located. For locations on Earth's surface, its atmosphere, or in a low orbital region, the U.S. Global Positioning System (GPS), Russian Glosnass system, and European Galileo system can be used to provide position and velocity information. For locations beyond the reach of one these systems, other techniques, such as radar, have been used. However, these techniques have disadvantages. GPS, Glonass, and Galileo, require an array of satellites in space, which is costly to establish and maintain. Deploying those satellites may also be beyond the capabilities of private actors or less developed nations. GPS, Glosnass, and Galileo are also government controlled systems and their accuracy may be artificially limited. Radar requires the use of a transmitter and a receiver which limits the region over which distances can be determined to a volume of space defined by the line-of-sight of the transmitter. Radar systems are also expensive to purchase and require skilled operators and routine maintenance to function properly. Thus, it would be beneficial to have a system and technique for measuring distances between two positions that mitigate some of these deficiencies.

SUMMARY OF THE INVENTION

One or more the above limitations may be diminished by structures and methods described herein.

In one embodiment, a system for determining the distance between two positions is provided. The system includes a correlator, a first receiver, and a second receiver. The first and second receivers each include: an antenna, a steering mechanism and a processor. The steering mechanism steers the antenna in an azimuthal direction and an elevation direction. The processor is configured to (i) control the steering mechanism, (ii) receive data recorded by the antenna from a plurality of sources, (iii) time-stamp the data recorded by the first antenna, and (iv) control the transmission of the time-stamped data to the correlator. The correlator is configured to receive the time-stamped from the first receiver and the second receiver, and calculate a distance between the first receiver and the second receiver based thereon.

In another embodiment, a method of determining a distance between two positions is provided. A first receiver that includes a first antenna is controlled to record a first data set from a first source, a second data set from a second source, and a third data set from a third source. A second receiver that includes a second antenna is controlled to record a fourth data set from the first source, a fifth data set from the second source, and a sixth data set from the third source. A distance between the first receiver and the second receiver is calculated based on first, second, third, fourth, fifth, and sixth data sets.

In yet another embodiment, an apparatus for determining a distance between two receivers is provided. The apparatus includes a computer that is configured to: receive a first data set corresponding to a first source, a second data set corresponding to a second source, and a third data set corresponding to a third source, wherein the first data set, the second data set, and the third data set were recorded by a first receiver, receive a fourth data set corresponding to the first source, a fifth data set corresponding to the second source, and a sixth data set corresponding to the third source, wherein the fourth, fifth, and sixth data sets were recorded by a second receiver, and calculate a distance between the first receiver and the second receiver based on the first, second, third, fourth, fifth, and sixth data sets.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

Figure 1:
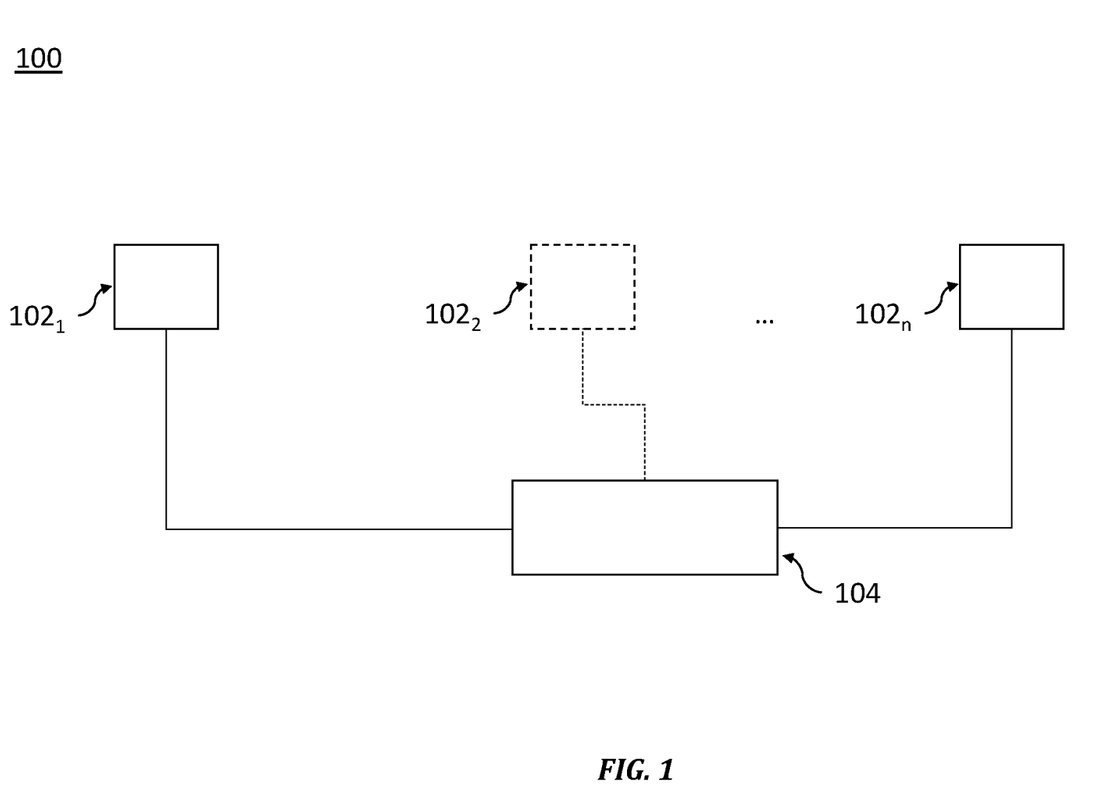
FIG. 1 illustrates a system for determining the distance between one or more pairs of receivers.

In accordance with example aspects, described herein are systems, methods, and apparatuses for determining the distance between two positions. FIG. 1 illustrates a system 100 for determining the distance between one or more pairs of receivers (e.g., $102_1$ and $102_2$, in general $102_i$ and $102_j$). Receivers $102_1 \ldots 102_n$ are constructed to receive electromagnetic signals, process those signals, and generate corresponding time-stamped data. Receivers $102_1 \ldots 102_n$ are constructed to receive signals over respective predefined bandwidths. These bandwidths need not be identical. However, each pair of receivers $102_i$ and $102_j$ must be capable of receiving and processing signals from the same multiple sources used to calculate the distance between them, as described below. Thus, there must be at least a partial overlap in the receiving bandwidths. The digitized and time-stamped data generated by receivers $102_i$ and $102_j$ are transmitted to a correlator 104 for analysis, as described below.

Figure 2:
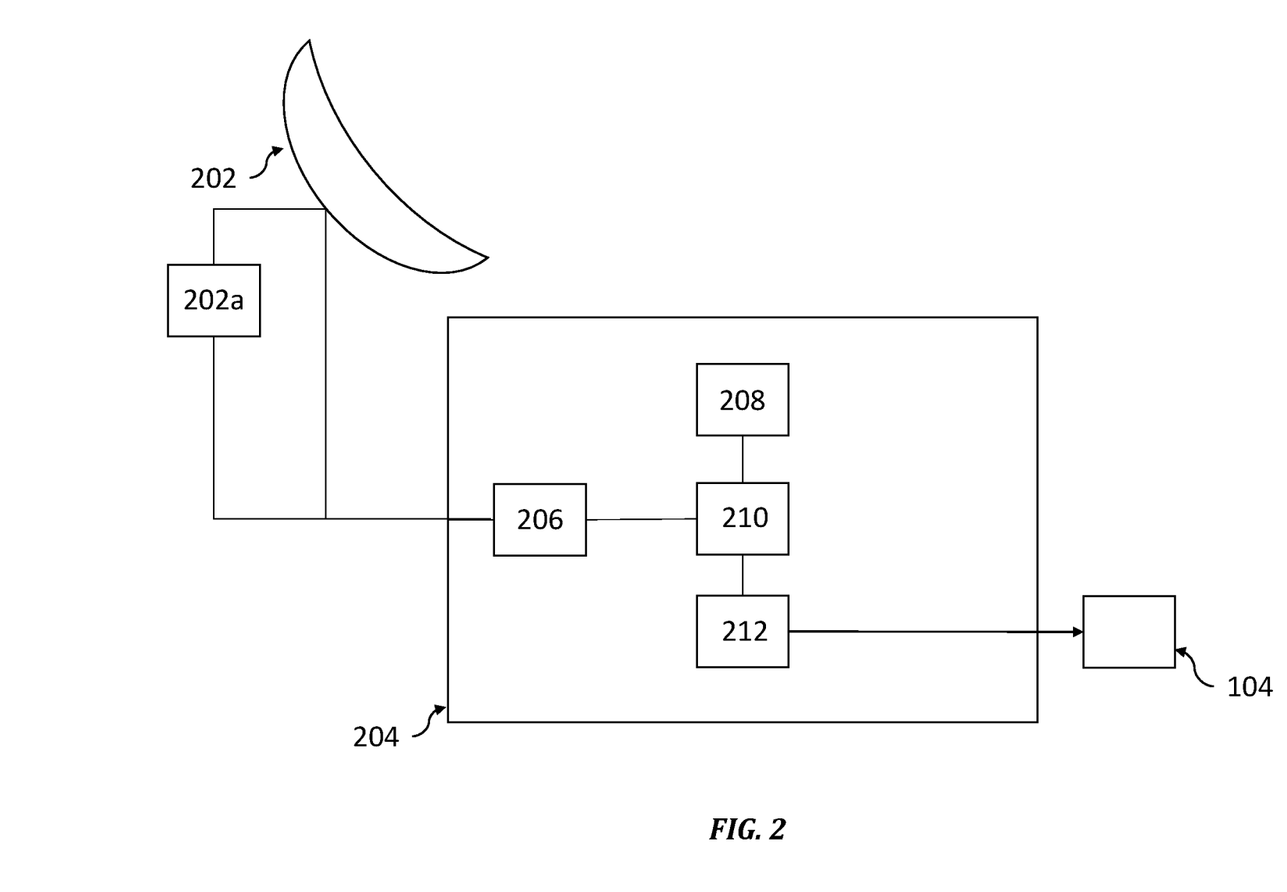
FIG. 2 is a block diagram of an exemplary receiver.

FIG. 2 illustrates the components of an exemplary receiver $102_i$ or $102_j$. As one of ordinary skill will appreciate, one of the benefits of system 100 is that the exact construction of the receivers can vary. Preferably, each receiver is capable of: 1) receiving signals from the sources used for the distance calculation, 2) generating a recorded time-stamped data set for each of those sources, and 3) communicating with a correlator 104 so as to receive instructions and transmit the data sets. The exemplary receiver $102_i$ includes an antenna 202 electrically connected to a computer 204. Antenna 202 may be steered in both the elevation and azimuthal directions by a steering mechanism 202a under the control of computer 204 so as to point to different sources. Radio signals impinging upon antenna 202 generate corresponding voltages which are recorded, digitized by an A/D converter (not shown), and transmitted to a data communication circuit 206 of computer 204. Data communication circuit 206 is constructed to receive data from antenna 202 and provide control signals to the antenna 202 and the steering mechanism 202a in accordance with instructions from processor 210. Processor 210 receives the recorded data and stores it in memory 208 with a corresponding time stamp based on an internal clock (not shown). Processor 210 is also constructed to send the recorded data to correlator 104 via a communication circuit 212 in accordance with a control program stored in memory 208. The transmission of the recorded data to correlator 104 may be in response to a signal from correlator 104 requesting the same.

Correlator 104 includes a processor, memory, and a communication circuit. In one embodiment, correlator 104 may include multiple processors. The memory includes programming that, when executed by one or more processors, enables the features disclosed herein, including, for example, the distance calculations described herein based on the recorded data sets from the receivers $102_1 \ldots 102_n$. The communication circuit is constructed to send to and receive data from the receivers $102_1 \ldots 102_n$ . . . . For example, correlator 104 may transmit instructions to the receivers $102_1 \ldots 102_n$ to record data sets from a series of sources, respectively. The instructions may include information on the location of the sources (e.g., their respective celestial coordinates), the frequency range over which the sources are to be recorded, and the length of time over which the sources are to be recorded.

In a preferred embodiment, the sources may be cosmic sources such as: stars, pulsars, supernova remnants, active galactic nuclei, quasars, and radio galaxies. Receivers $102_i$ and $102_j$ may, in response to the instructions from correlator 104, record and transmit the data sets, respectively corresponding to the sources, to the correlator 104. As noted above, each data set is time-stamped. Correlator 104 is constructed to use the time-stamps to synchronize the recorded data sets. In one embodiment, the receivers $102_i$ and $102_j$ may record data from an additional source and provide that time-stamped data set to correlator 104 for the purpose of synchronizing the clocks on the receivers $102_i$ and $102_j$. Correlator 104 is constructed to analyze the recorded data sets to identify the same signal in each data set. The difference in time between when the identified signal is received at receivers $102_i$ and $102_j$ is used to calculate a component of the distance between the receivers $102_i$ and $102_j$ in the direction of the source, as explained below and illustrated by FIGS. 3A-6B.

Figure 3A:
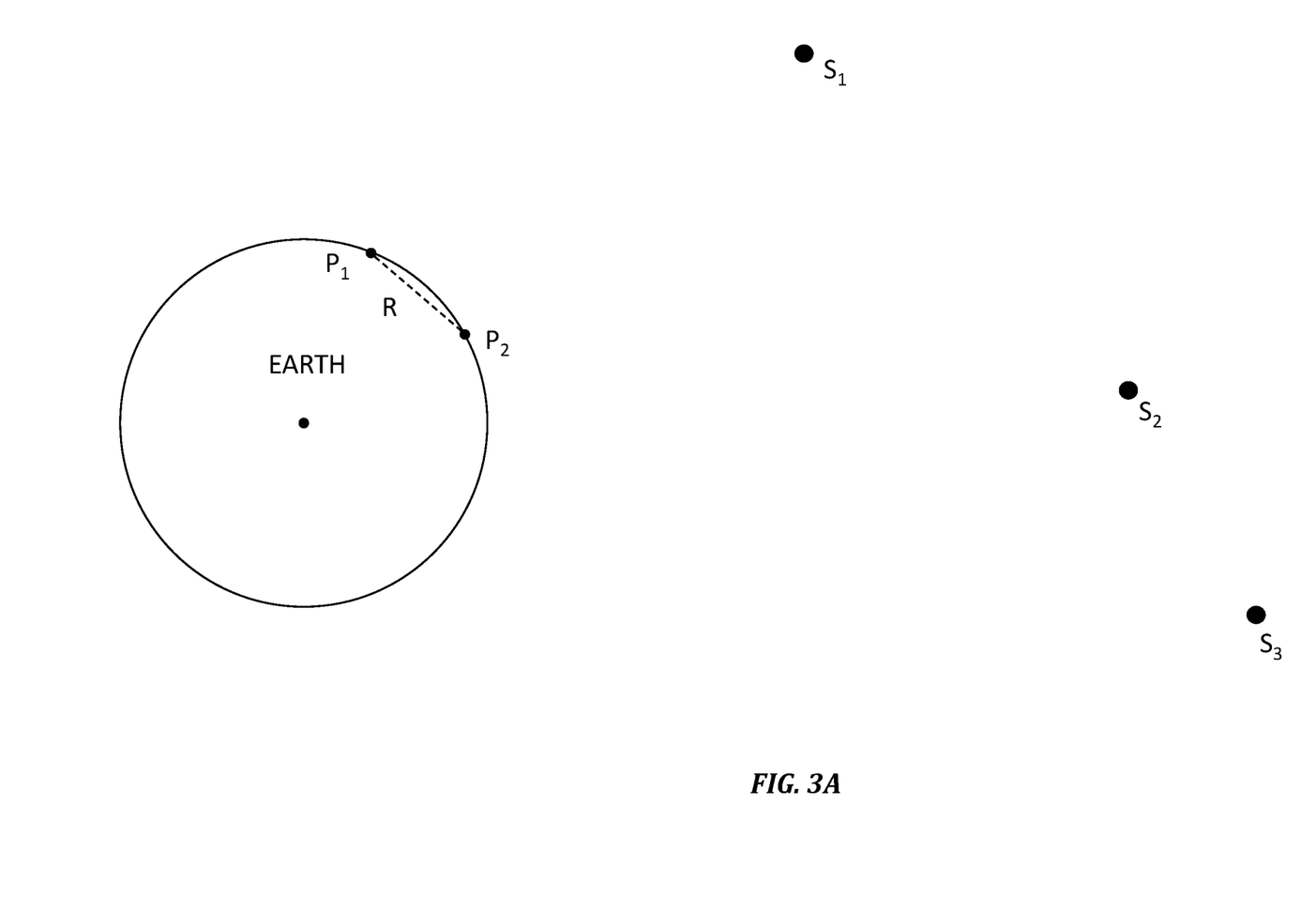
FIG. 3A illustrates a plurality of sources used to determine a distance between two positions.

FIG. 3A shows the locations of two receivers $102_1$ and $102_2$ at points $P_1$ and $P_2$ on Earth, respectively. The distance between receivers $102_1$ and $102_2$ is some unknown value R. Receivers $102_1$ and $102_2$ may be steered such that their respective antennas point toward the same source. In one embodiment, this steering is done in response to instructions received from correlator 104. In a preferred embodiment, the sources are stellar objects located at a distance from the Earth that is much larger than the diameter of the Earth. This allows for the signals from the sources to be considered as plane waves rather than spherical waves. However, it is also possible to use sources located closer to Earth such that the planar approximation is no longer valid. In that instance, the signals would be treated as spherical waves emanating from the source rather than plane waves. The distance at which the planar approximation is no longer valid is dependent upon the desired precision in the measurement of the distance between the two receivers $102_i$ and $102_j$, as illustrated in FIG. 3B.

Figure 3B:
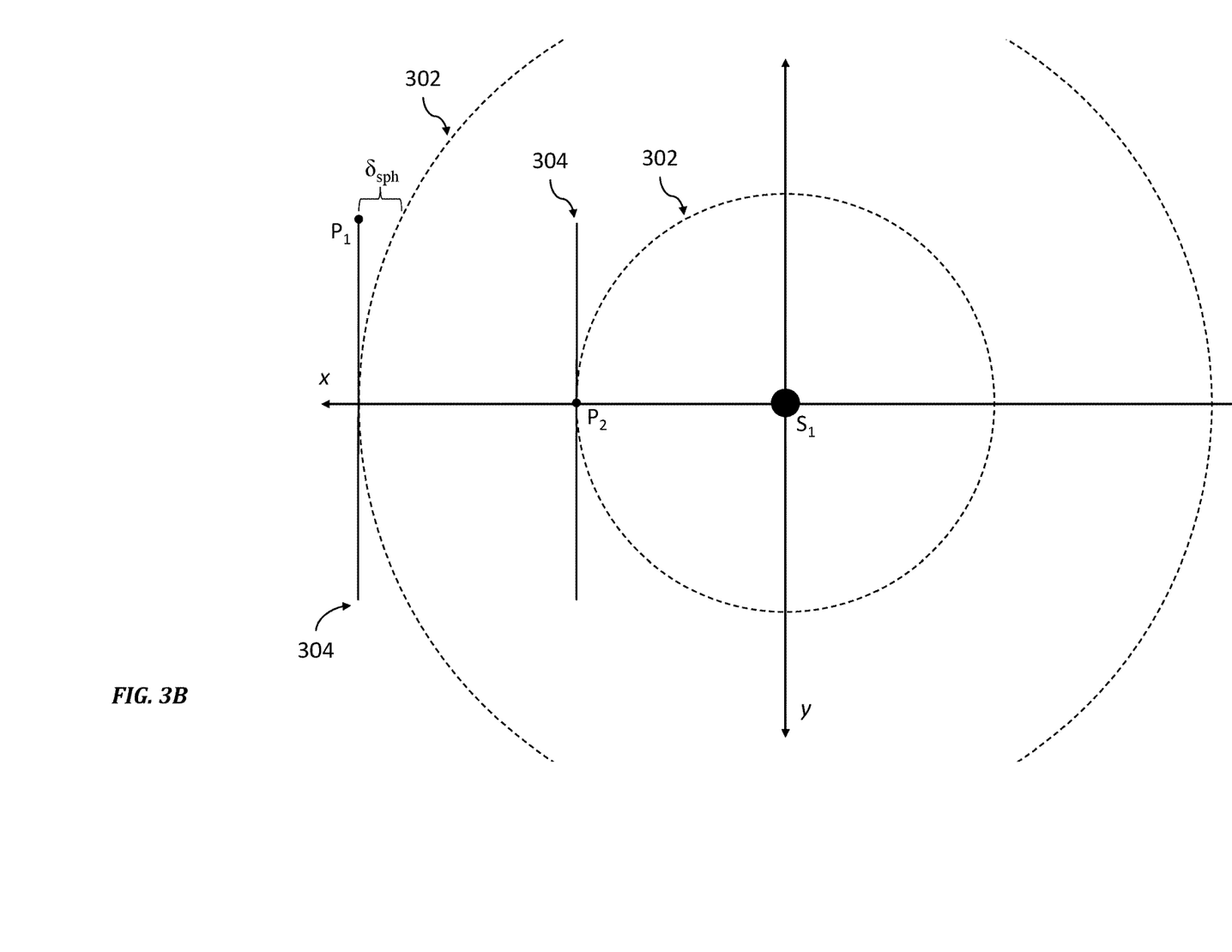
FIG. 3B illustrates the spread of a planar wavefront and a spherical wavefront.

In FIG. 3B, source $S_1$ is located a distance from $P_2$ along the x-axis. A spherical wavefront signal 302 emanating from source $S_1$ reaches $P_2$ first at the same time a planar wavefront signal 304 travelling along the x-axis would arrive. However, the planar wavefront signal 304 would reach $P_1$ earlier than the spherical wavefront 302. The spherical wavefront 302 would, in effect, lag behind the planar wavefront 304 by a distance $\delta_{sph}$. Of course, this is only a mathematical artifact as the spherical wavefront travels at the speed of light and thus the planar wavefront would have to travel faster than the speed of light to arrive at point $P_1$ before the spherical wavefront. Only in a small region, close to the x-axis where the planar wavefront 304 is tangent to the spherical wavefront 302 is the planar wavefront approximation valid. In other words, the radius of curvature of the spherical wavefront 302 must be sufficiently small that it may be considered substantially zero over an arc length that is the diameter of the Earth. Mathematically, the radius of curvature will only be zero for a source that infinitely far from the Earth. However, if the radius of curvature is sufficiently small such that the time between when the planar wavefront and when a spherical wavefront would arrive is less than the accuracy with which the clocks at the receivers are synchronized, then any error attributable to the approximation is insignificant. Signals emanating from sources that are at distances of at least $R^2/\lambda$ from the Earth may be approximated with a planar wavefront, where R is the separation between antennas (see FIG. 3A) and $\lambda$ is the observing wavelength. In the microwave regime and for any realistic antenna deployment on or near Earth, all objects outside of our solar system meet this criterion. By using a planar wavefront approximation, the step of calculating a plane, perpendicular to the direction of the source, on which one of the receivers must lie, is simplified, as explained below.

Figure 4A:
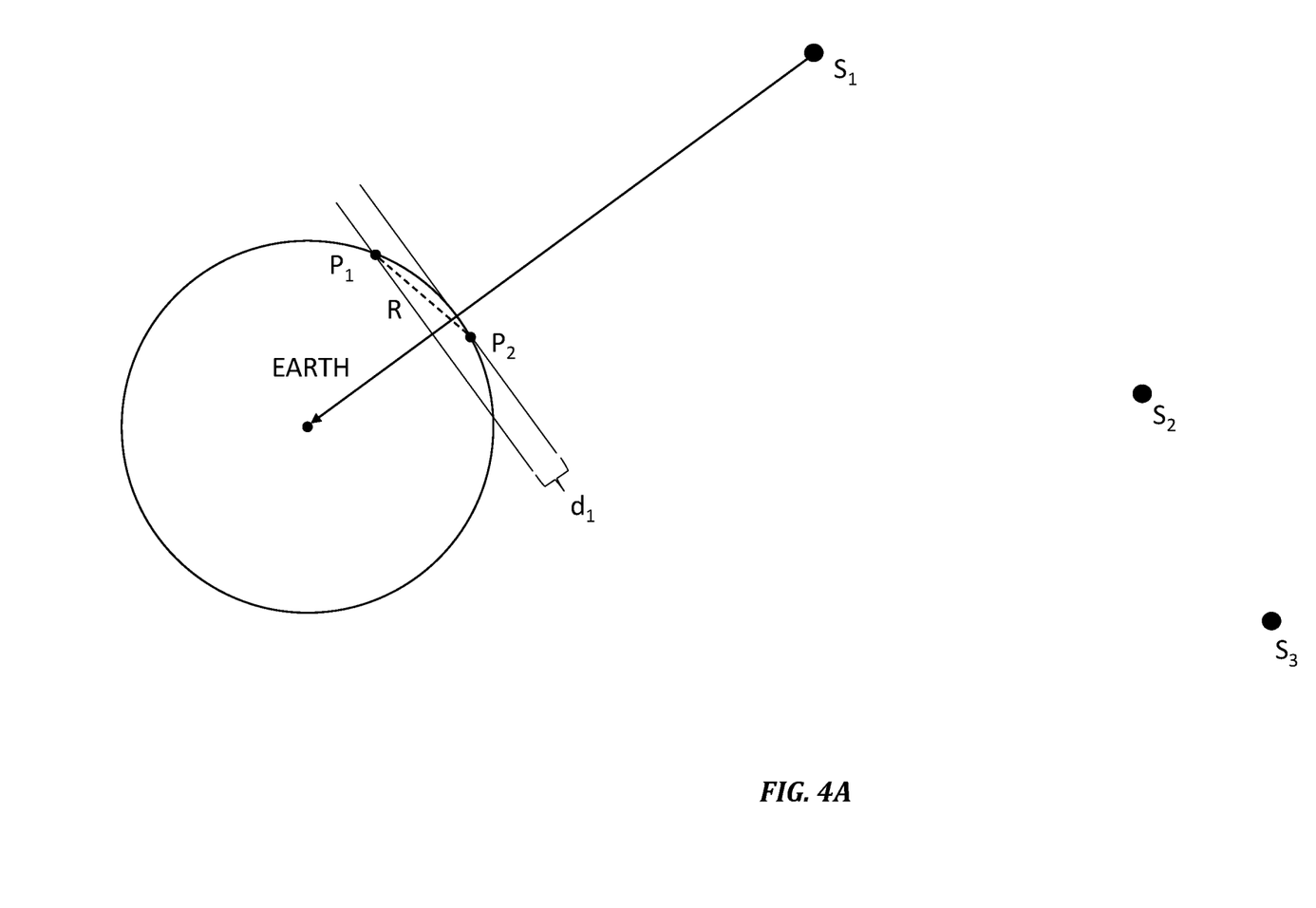
FIG. 4A illustrates receiving a signal from a first source.
Figure 4B:
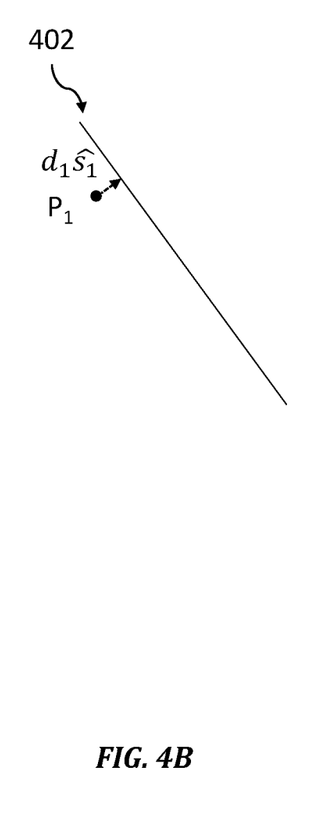
FIG. 4B illustrates a line a certain distance from a first position on which another receiver must lie.

Turning to FIG. 4A, receivers $102_1$ and $102_2$ are both pointed towards source $S_1$. Source $S_1$ is sufficiently far from Earth that its signal may be considered a plane wavefront rather than a spherical wavefront. In FIG. 4A, the signal from source $S_1$ arrives at receiver $102_2$, located at position $P_2$, first. Then, a time $t_1$ later, the signal arrives at receiver $102_1$ located at position $P_1$. Since the signal travels at the speed of light, the difference between the two arrival times (the time difference of arrival) may be used to calculate the distance $d_1$ between receivers $102_1$ and $102_2$ in the $S_1$ direction ($\hat{s}_1$). As shown in FIG. 4B, the time difference of arrival between receivers $102_1$ and $102_2$ informs that the location of $P_2$ must be on a line 402 (a plane in three dimensions) that is a distance $d_1$ away from $P_1$ in the $\hat{s}_1$ direction and which is perpendicular to the $\hat{s}_1$ direction. The distance to that plane ($d_1$) can be calculated by multiplying the time $t_1$ by the speed of light. In a case, where the planar approximation is invalid, then the distance $d_1$ (calculated as described above) would correspond to a distance from $P_1$ to a closest position on a curved plane whose shape depends on the distance to source $S_1$. The location of $P_2$, and thus the distance between $P_1$ and $P_2$, however cannot be determined based on information from source $S_1$ alone. Thus, receivers $102_1$ and $102_2$ move their respective antennae 202 to a new source $S_2$, as illustrated in FIG. 5A.

Figure 5A:
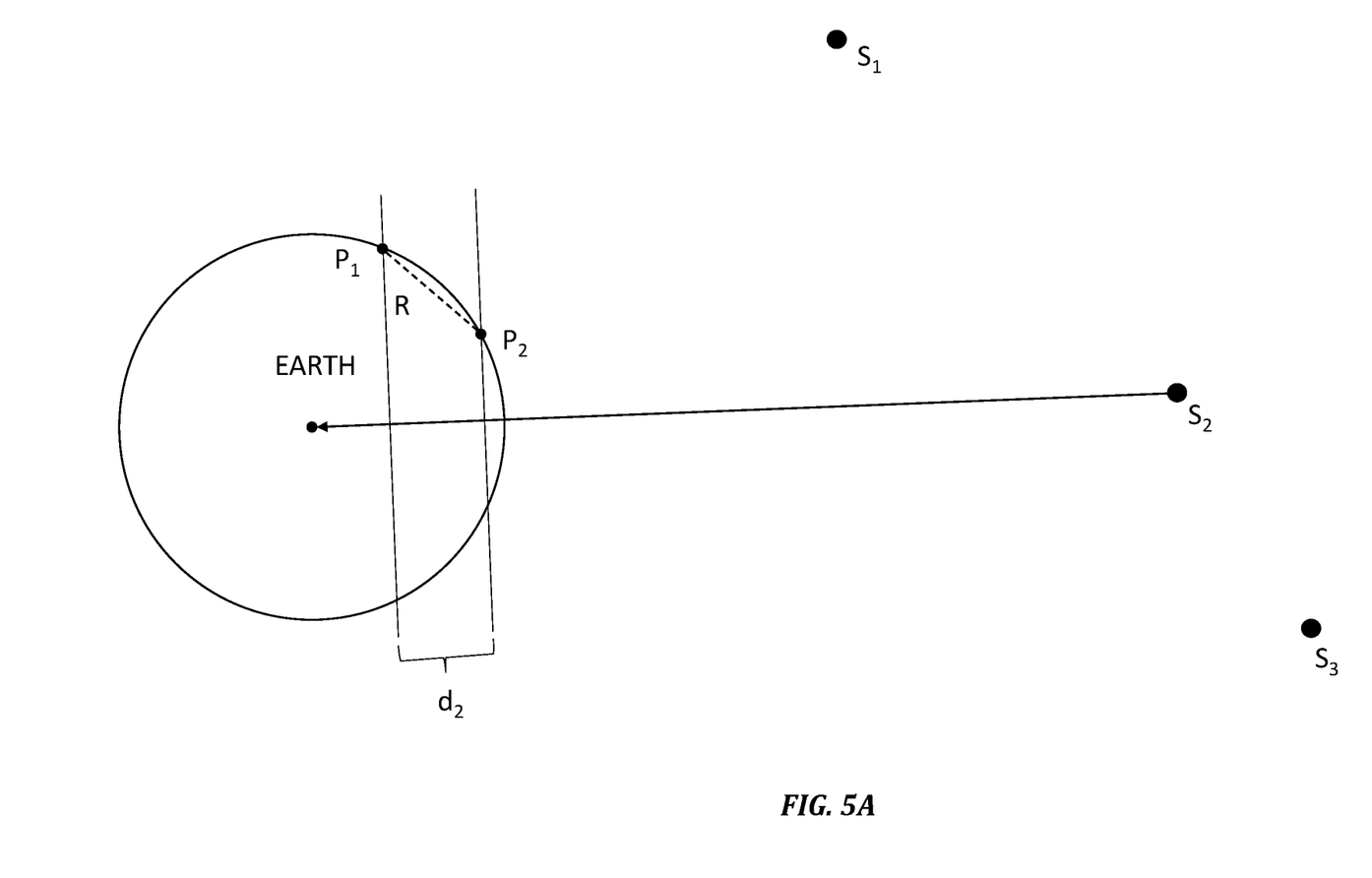
FIG. 5A illustrates receiving a signal from a second source.
Figure 5B:
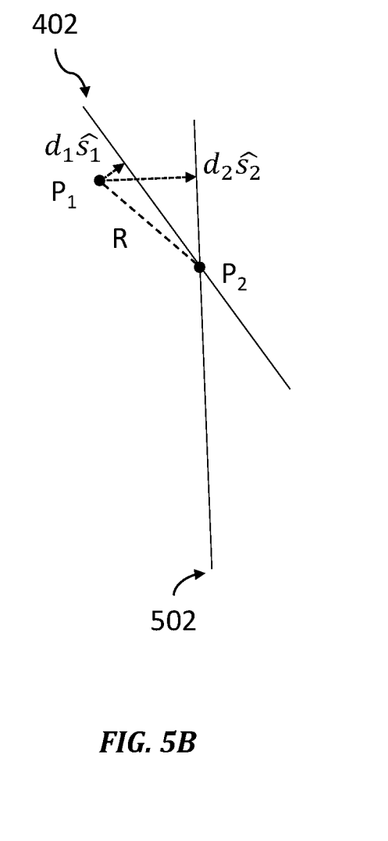
FIG. 5B illustrates another line a certain distance from a first position on which the other receiver must lie.

In FIG. 5A, receivers $102_1$ and $102_2$ are positioned to receive a signal from source $S_2$. Like with source $S_1$, source $S_2$ is far enough away from the Earth that its signal may be considered to have a planar wavefront. The signal from source $S_2$ initially arrives at receiver $102_2$, located at position $P_2$, and subsequently arrives at receiver $102_1$ a time $t_2$ later. The signal from source $S_2$ travels at the speed of light, and thus the distance between $P_1$ and a line 502 (a plane in three dimensions) on which $P_2$ must lie, and which is perpendicular to the $\hat{s}_2$ direction can be calculated from the time $t_2$. FIG. 5B shows the location of lines 402 and 502. The point at which these two lines intersect corresponds to the location of point $P_2$. While only two sources are necessary to resolve the location of point $P_2$ in two dimensions, in three dimensions a third source is necessary. In three dimensions, the intersection of planes 402 and 502 define a line rather than a point. Thus, with only two sources there would remain an infinite number of positions on a line defined by the intersection of planes 402 and 502 that would be a satisfactory position for point $P_2$. Receivers $102_1$ and $102_2$ therefore turn towards a third source $S_3$, as illustrated in FIG. 6A.

Figure 6A:
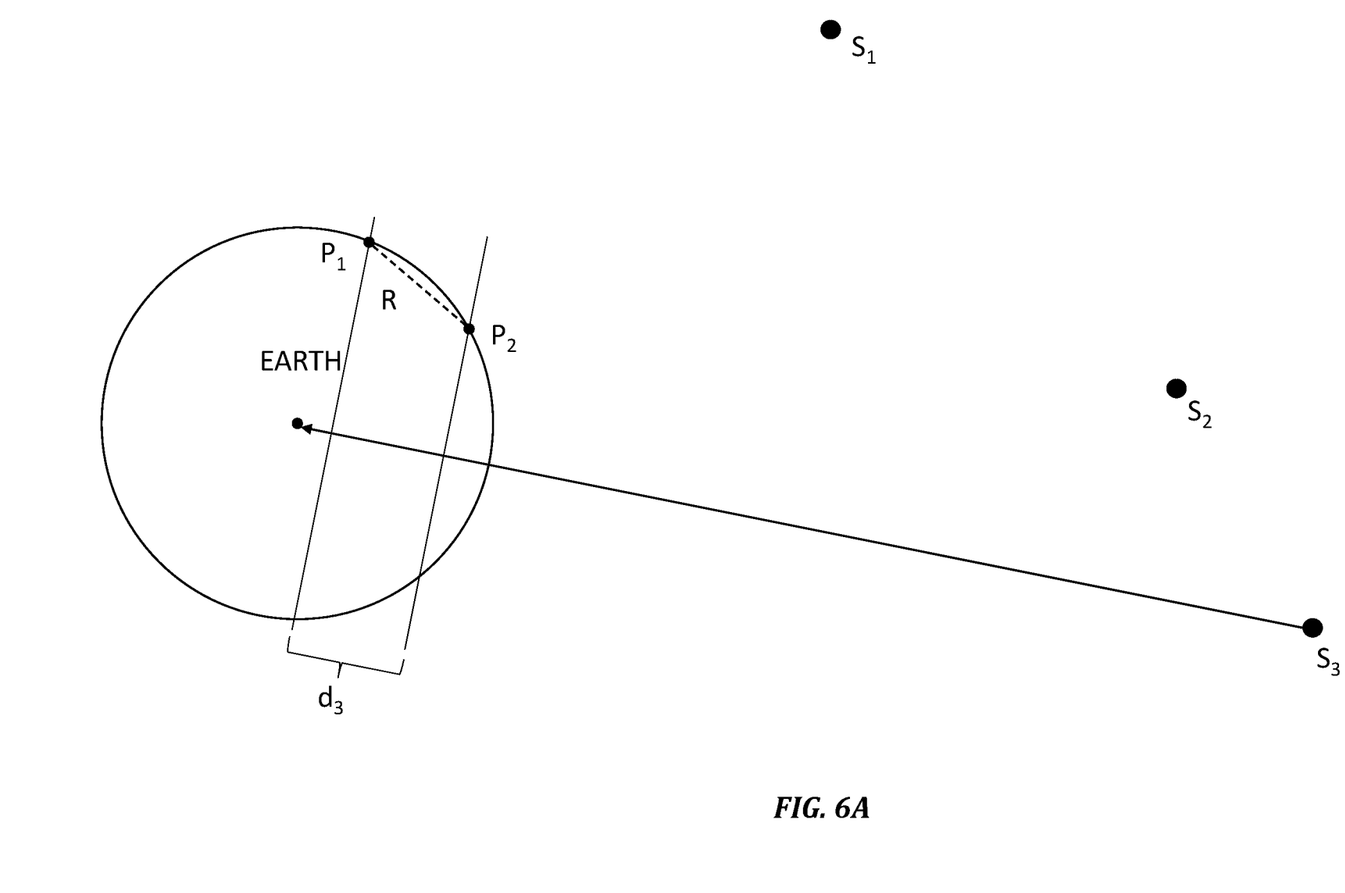
FIG. 6A illustrates receiving a signal from a third source.
Figure 6B:
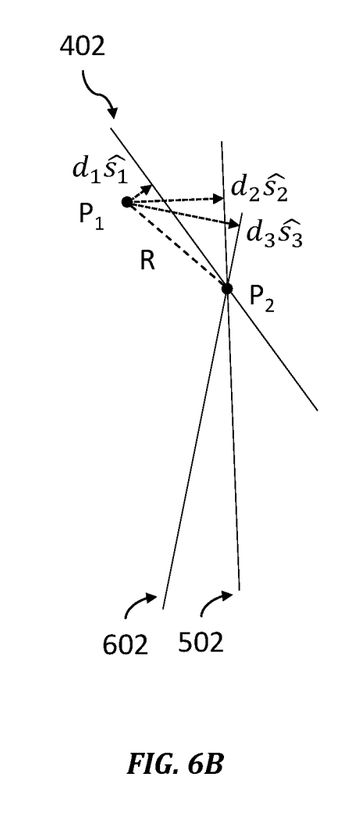
FIG. 6B illustrates yet another line a certain distance from a first position on which the other receiver must lie.

FIG. 6A shows receivers $102_1$ and $102_2$ positioned to receive a signal from source $S_3$. Like with sources $S_1$ and $S_2$ above, source $S_3$ is sufficiently far from the Earth such that the signal therefrom can be considered a plane wavefront. The signal from $S_3$ arrives at $P_2$ and then a time $t_3$ later arrives at $P_1$. Like above, the time difference of arrival $t_3$ may be used to calculate the distance $d_3$ to a plane 602 on which the point $P_2$ must lie by multiplying the time $t_3$ by the speed of light. FIG. 6B shows the three planes 402, 502, and 602, the intersection of which defines the location of $P_2$. The vector R from $P_1$ to $P_2$ can then be calculated from Equation 1 below:

$$\vec{R} = d_1 \hat{s}_1 + d_2 \hat{s}_2 + d_3 \hat{s}_3 \qquad \text{Equation 1:}$$

The precision with which the distance between $P_1$ and $P_2$ can be determined is dependent upon several factors, including: the effective area of the antenna ($A_{eff}$), the coherent integration time (CIT), and the bandwidth ($\Delta f$) over which the voltages are recorded, as set forth by Equation 2 below:

$$\sigma_{TDOA} = 900(A_{eff}\Delta f^{3/2} \text{CIT}^{1/2})^{-1} \qquad \text{Equation 2:}$$

The effective area of the antenna is the actual area of the antenna multiplied by the efficiency of the antenna. The coherent integration time is the time over which the signals from the two antennas are coherently averaged. For example, for a receiver $102_i$ with a one meter antenna 202, a bandwidth of 50 MHz and a CIT of 10 seconds, nanosecond level precision can be achieved. Light travels at approximately 1 foot/nanosecond, thus the precision of the distance measurements can be on the scale of feet. By using, in one embodiment, cosmic sources available to all, it is possible to determine the distance between two positions with a high degree of accuracy. Moreover, as Equation 2 demonstrates, a large antenna is not necessarily required. A smaller antenna may be used and the same level of precision achieved by increasing the coherent integration time or the bandwidth over which the voltages are recorded. Thus, a small antenna that is easily affixed to a portable object (e.g., a car, boat, or airplane) may be suitable.

As discussed above, correlator 104 relies upon the time-stamped data sets to synchronize the data sets collected by the receivers $102_i$ and $102_j$. In practice, however, the internal clocks of each receiver may not be aligned precisely. To compensate for this effect and obtain a higher level of precision, another source $S_4$ may be recorded to generate a dataset that can be used to solve for the offset between the clocks on the receivers $102_i$ and $102_j$. The measured time difference of arrival (TDOA) towards a single source $S_4$ is given by Equation 3 below:

$$TDOA = \frac{(l\Delta x + m\Delta y + n\Delta z)}{c} + \Delta t \qquad \text{Equation 3}$$

In Equation 3, $\Delta x$, $\Delta y$, and $\Delta z$ are the components of the vector $\vec{R}$ separating the two receivers $102_i$ and $102_j$, and l, m, and n are the components of a unit vector pointing towards the sources, respectively. By using four sources, with four unique sets of l, m, and n, the unknowns $\Delta x$, $\Delta y$, $\Delta z$, and $\Delta t$ can be solved for simultaneously.

In one embodiment, multiple pairs of receivers 102 may be used. Distances between each of the pairs can be determined by the techniques described above. With respect to determining a time offset, a separate value of $\Delta t$ can be measured for each pair of receivers $102i$ and $102_j$.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for determining a distance between two receivers, comprising:
   a correlator;
   a first receiver that includes:
   a first antenna,
   a first steering mechanism configured to steer the first antenna in an azimuthal direction and an elevation direction, and
   a first processor configured to: (i) control the first steering mechanism, (ii) receive first data recorded by the first antenna from a plurality of sources, (iii) time-stamp the first data recorded by the first antenna, and (iv) control the transmission of the time-stamped first data to the correlator;

a second receiver that includes:
  a second antenna,
  a second steering mechanism configured to steer the second antenna in an azimuthal direction and an elevation direction, and
  a second processor configured to: (i) control the second steering mechanism, (ii) receive second data recorded by the second antenna from the plurality of sources, (iii) time-stamp the second data recorded by the second antenna, and (iv) control the transmission of the time-stamped second data to the correlator;

wherein the correlator is configured to receive the time-stamped first recorded data and the time-stamped second recorded data from the first receiver and the second receiver, respectively, and calculate a distance between the first receiver and the second receiver based on the time-stamped first recorded data and the time-stamped second recorded data.

2. A method of determining a distance between two positions, comprising:
  controlling a first receiver that includes a first antenna to record a first data set from a first source, a second data set from a second source, and a third data set from a third source;
  controlling a second receiver that includes a second antenna to record a fourth data set from the first source, a fifth data set from the second source, and a sixth data set from the third source; and
  calculating a distance between the first receiver and the second receiver based on the first, second, third, fourth, fifth, and sixth data sets.

3. The method of claim 2, wherein the first data set is stamped with a first time stamp, the second data set is stamped with a second time stamp, the third data set is stamped with a third time stamp, the fourth data set is stamped with a fourth time stamp, the fifth data set is stamped with a fifth time stamp, and the sixth data set is stamped with a sixth time stamp.

4. The method of claim 3, further comprising:
  synchronizing the first, second, third, fourth, fifth, and sixth data sets using the first, second, third, fourth, fifth, and sixth time stamps.

5. The method of claim 4, wherein the first, second, and third time stamps are generated by a first clock included in the first receiver, and the fourth, fifth, and sixth time stamps are generated by a second clock included in the second receiver.

6. The method of claim 4, wherein the synchronized first, second, third, fourth, fifth, and sixth data sets are used in the calculating step to calculate the distance between the first receiver and the second receiver.

7. The method of claim 2, further comprising:
  receiving a seventh data set corresponding to a fourth source and an eighth data set corresponding to the fourth source, wherein the seventh data set was recorded by the first receiver and the eighth data set was recorded by the second receiver.

8. The method of claim 7, further comprising:
  synchronizing a first clock on the first receiver and a second clock on the second receiver based on the seventh data set and the eighth data set.

9. The method according to claim 8, wherein the first data set is stamped with a first time stamp, the second data set is stamped with a second time stamp, the third data set is stamped with a third time stamp, the fourth data set is stamped with a fourth time stamp, the fifth data set is stamped with a fifth time stamp, the sixth data set is stamped with a sixth time stamp, the seventh data set is stamped with a seventh time stamp, and the eighth data set is stamped with an eighth time stamp,
  wherein the first, second, third, and seventh time stamps are generated by the first clock, and
  wherein the fourth, fifth, sixth, and eighth time stamps are generated by the second clock.

10. The method according to claim 9, further comprising:
  adjusting one or more of the first, second, third, fourth, fifth, and sixth time stamps based on the synchronized first and second clocks, and
  wherein the one or more of the adjusted first, second, third, fourth, fifth, and sixth time stamps is used in the calculating step to calculate the distance between the first receiver and the second receiver.

11. The method of claim 2, wherein the first source, the second source, and the third source are different stellar objects.

12. An apparatus for determining a distance between two receivers, comprising:
  a computer configured to:
    receive a first data set corresponding to a first source, a second data set corresponding to a second source, and a third data set corresponding to a third source, wherein the first data set, the second data set, and the third data set were recorded by a first receiver,
    receive a fourth data set corresponding to the first source, a fifth data set corresponding to the second source, and a sixth data set corresponding to the third source, wherein the fourth data set, the fifth data set, and the sixth data set were recorded by a second receiver, and
    calculate a distance between the first receiver and the second receiver based on the first, second, third, fourth, fifth, and sixth data sets.

13. The apparatus according to claim 12, wherein the first data set is stamped with a first time stamp, the second data set is stamped with a second time stamp, the third data set is stamped with a third time stamp, the fourth data set is stamped with a fourth time stamp, the fifth data set is stamped with a fifth time stamp, and the sixth data set is stamped with a sixth time stamp.

14. The apparatus according to claim 13, wherein the computer is further configured to synchronize the first, second, third, fourth, fifth, and sixth data sets using the first, second, third, fourth, fifth, and sixth time stamps.

15. The apparatus according to claim 14, wherein the first, second, and third time stamps are generated by a first clock included in the first receiver, and the fourth, fifth, and sixth time stamps are generated by a second clock included in the second receiver.

16. The apparatus according to claim 14, wherein the computer is further configured to use the synchronized first, second, third, fourth, fifth and sixth data sets in the calculation of the distance between the first receiver and the second receiver.

17. The apparatus according to claim 12, wherein the computer is further configured to:
  receive a seventh data set corresponding to a fourth source and an eighth data set corresponding to the fourth source, wherein the seventh data set was recorded by the first receiver and the eighth data set was recorded by the second receiver.

18. The apparatus according to claim 17, wherein the computer is further configured to synchronize a first clock on the first receiver and a second clock on the second receiver based on the seventh data set and the eighth data set.

19. The apparatus according to claim 18, wherein the first data set is stamped with a first time stamp, the second data set is stamped with a second time stamp, the third data set is stamped with a third time stamp, the fourth data set is stamped with a fourth time stamp, the fifth data set is stamped with a fifth time stamp, the sixth data set is stamped with a sixth time stamp, the seventh data set is stamped with a seventh time stamp, and the eighth data set is stamped with an eighth time stamp,
- wherein the first, second, third, and seventh time stamps are generated by the first clock,
- wherein the fourth, fifth, sixth, and eighth time stamps are generated by the second clock
- wherein the computer is further configured to adjust one or more of the first, second, third, fourth, fifth, and sixth time stamps based on the synchronized first and second clocks, and
- wherein the computer is further configured to use one or more of the adjusted first, second, third, fourth, fifth, and sixth time stamps in the calculation of the distance between the first receiver and the second receiver.

20. The apparatus of claim 12, wherein the first source, the second source, and the third source are different stellar objects.

* * * * *